United States Patent
Suzuki (10) Patent No.: US 8,004,506 B2
(45) Date of Patent: Aug. 23, 2011

(54) DISPLAY CONTROL DEVICE, DISPLAY CONTROL METHOD, AND PROGRAM

(75) Inventor: Shinsuke Suzuki, Tokyo (JP)

(73) Assignee: Sony Corporation (JP)

( * ) Notice: Subject to any disclaimer, the term of this patent is extended or adjusted under 35 U.S.C. 154(b) by 669 days.

(21) Appl. No.: 11/541,621

(22) Filed: Sep. 28, 2006

(65) Prior Publication Data

US 2007/0164926 A1 Jul. 19, 2007

(30) Foreign Application Priority Data

Sep. 29, 2005 (JP) ................ P2005-283371

(51) Int. Cl.
*G09G 5/00* (2006.01)
(52) U.S. Cl. ............ 345/204; 348/445; 348/469
(58) Field of Classification Search .......... 345/204, 345/698, 699; 348/445, 578, 441, 469, 473, 348/558, 561
See application file for complete search history.

(56) References Cited

U.S. PATENT DOCUMENTS

| | | | | |
|---|---|---|---|---|
| 4,679,077 A | * | 7/1987 | Yuasa et al. ............ | 348/154 |
| 5,249,049 A | * | 9/1993 | Kranawetter et al. ........ | 348/473 |
| 5,298,994 A | * | 3/1994 | Watanabe et al. ............ | 348/445 |
| 7,015,976 B1 | * | 3/2006 | Orr et al. .................... | 348/578 |

FOREIGN PATENT DOCUMENTS

| | | |
|---|---|---|
| JP | 08-317303 A | 11/1996 |
| JP | 2001-008128 A | 1/2001 |
| JP | 2002-077768 A | 3/2002 |
| JP | 2003-032569 A | 1/2003 |
| JP | 2003-333455 A | 11/2003 |

* cited by examiner

*Primary Examiner* — Stephen G Sherman
(74) *Attorney, Agent, or Firm* — Lerner, David, Littenberg, Krumholz & Mentlik, LLP (57) ABSTRACT

A display control device for controlling the display of an image in a display device includes a decision unit configured to decide whether the state of a scaling of a moving-image portion in a display object image or an image to be displayed in the display device has changed; and a display control unit configured to select a screen mode for displaying the display object image in response to the change in the scaling state of the moving-image portion in the display object image, and to display the display object image in the screen mode in the display device.

4 Claims, 11 Drawing Sheets

FULL MODE

WIDE ZOOM MODE

ZOOM MODE

FIG. 3

LETTER/DRAWING/MOVING-IMAGE COMBINED PICTURE
(16 : 9 ENTIRE, 4 : 3 IMAGE PORTION)

IN NONSCALED CASE

| IMAGE FORMAT | SCREEN MODE BY AUTO WIDE |
|---|---|
| ORDINARY 16 : 9 | FULL MODE |
| ORDINARY 4 : 3 | WIDE ZOOM MODE |
| SIDE PANEL 16 : 9 | WIDE ZOOM MODE |
| LETTER BOX 16 : 9 | ZOOM MODE |

IN SCALED CASE

| ENTIRE ASPECT RATIO | SCREEN MODE BY AUTO WIDE |
|---|---|
| 16 : 9 | FULL MODE |
| 4 : 3 | WIDE ZOOM MODE |

DISPLAY AREA

DISPLAY AREA

DISPLAY CONTROL DEVICE, DISPLAY CONTROL METHOD, AND PROGRAM

CROSS-REFERENCE TO RELATED APPLICATIONS

The present application claims priority from Japanese Patent Application No. JP 2005-283371 filed on Sep. 29, 2005, the disclosure of which is hereby incorporated by reference herein.

BACKGROUND OF THE INVENTION

1. Field of the Invention

The present invention relates to a display control device, a display control method and a program and, more particularly, to a display control device, a display control method and a program, which can display an image properly.

2. Background Art

In the digital broadcasting, there are broadcast images which have different image formats such as the aspect ratios of the entire image or the aspect ratios (or the image sizes) of the effective moving-image portions in the image. In the digital broadcasting, for example, there are broadcast images having the entire aspect (horizontal to vertical) ratios of 16:9 and 4:3.

The images of the following image formats are broadcast as the image (as will be suitably called the "16:9 image") of the aspect ratio of 16:9 in the digital broadcasting.

Figure 1:
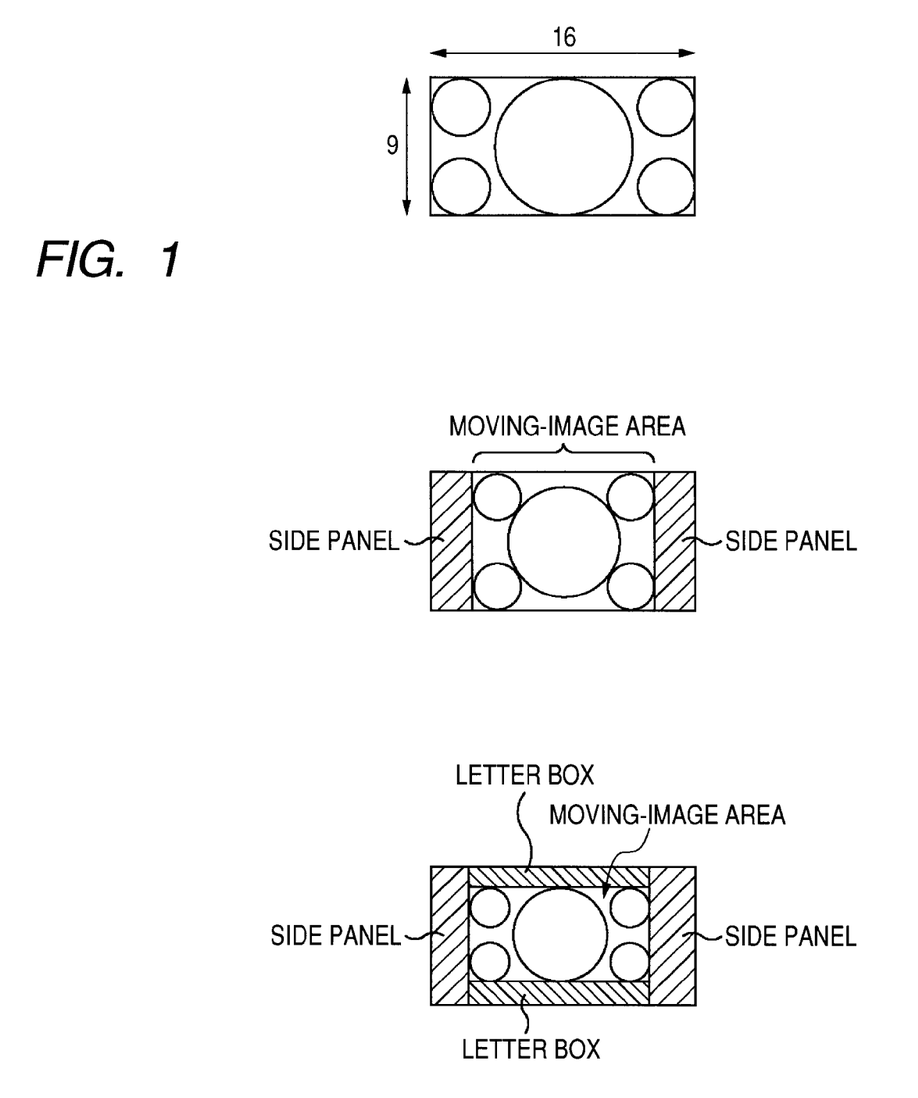
FIG. 1 presents diagrams for explaining image formats.

Specifically, FIG. 1 presents the 16:9 images of three kinds of image formats.

The first one from the top of FIG. 1 presents the 16:9 image (as will be suitably called the "ordinary 16:9 image") of the image format presenting the entirely effective moving-image portion of the 16:9 image (or the image size of the effective moving-image portion in the 16:9 image is identical to that of 16:9 image). Here, the image format of the ordinary 16:9 image will be suitably called the "ordinary 16:9".

The second one from the top of FIG. 1 presents the 16:9 image (as will be suitably called the "16:9 image with side panels") of the image format, in which the image of the aspect ratio of 4:3 of the center portion excepting the right and left end portions of the 16:9 image is an effective moving-image portion.

Here in the 16:9 image with the side panels, the right and left end portions other than the effective moving-image portion are called the side panels. The image format of the 16:9 image with the side panels will be suitably called the "side panel 16:9".

Here, the 16:9 image with the side panels can be obtained by forming the side panels on the right and left of the image of the aspect ratio of 4:3 of the NTSC (National Television System Committee), for example.

The third one from the top (or the first one from the bottom) of FIG. 1 presents the 16:9 image (as will be suitably called the "letter box image") of the image format, in which the image of the aspect ratio of 16:9 of the central portion of the 16:9 image with the side panels but excepting the upper and lower end portions is the effective moving-image portion.

Here in the letter box image, the upper and lower end portions other than the effective moving-image portion is called the "letter box". The image format of the letter box image will be suitably called the "letter box 16:9".

On the other hand, there has spread the so-called "wide TV (wide television receiver)", which is equipped with a display having a display area (or a display screen) of an aspect ratio of 16:9 for displaying an image in the display area.

In the wide TV, there have been prepared screen modes for displaying the images of the aforementioned individual image formats in the display.

Figure 2:
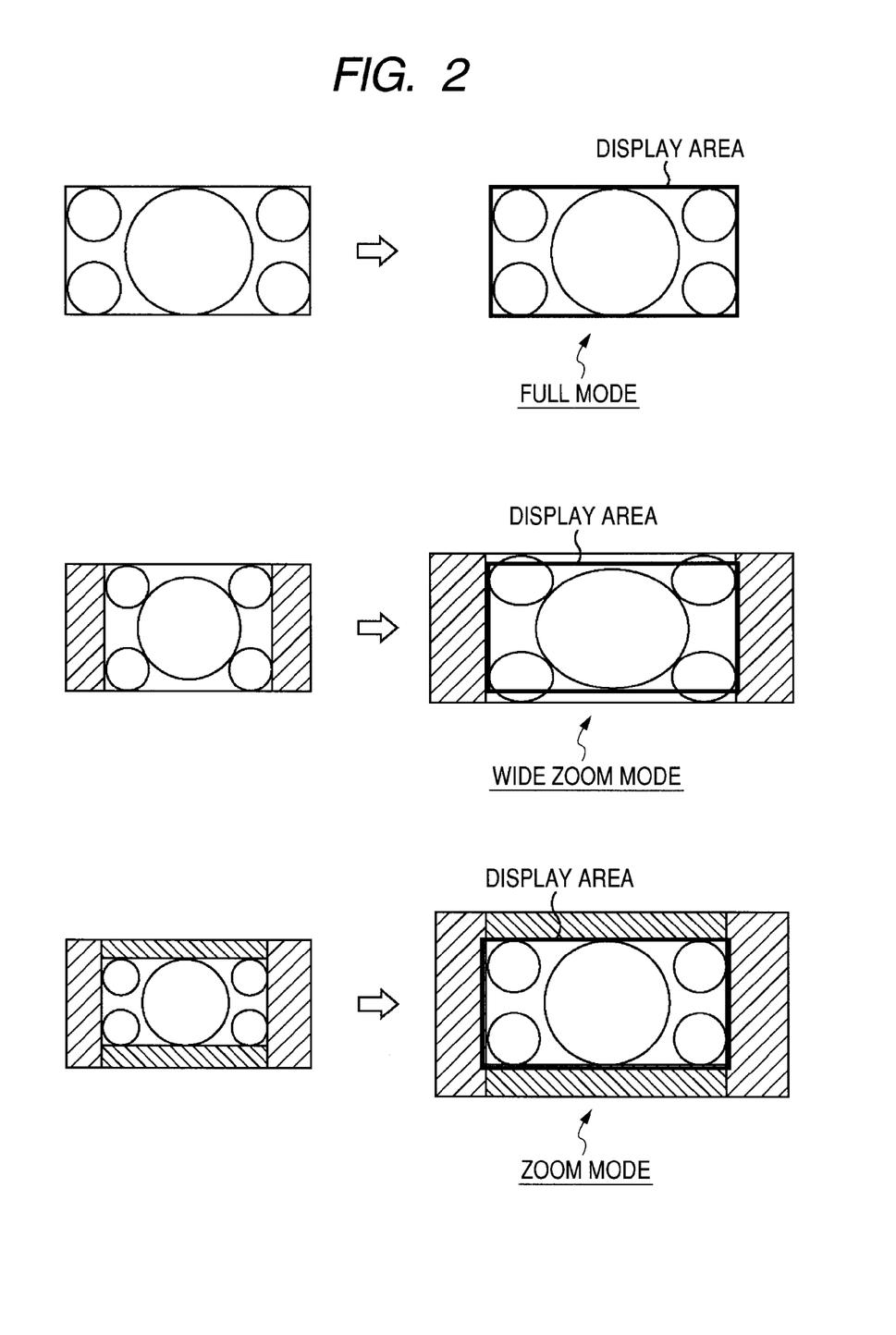
FIG. 2 presents diagrams for explaining screen modes.

FIG. 2 shows display examples of images in the individual screen modes on the wide TV.

The first one from the top of FIG. 2 presents a display example of the 16:9 image, as displayed in a screen mode called the "full mode".

This "full mode" is the screen mode, in which the 16:9 image is displayed as it is, so that the 16:9 image is displayed as it is in the 16:9 display area of the display. Thus in the "full mode", the 16:9 image is displayed as it is, so that the full mode is suitable for the display of the ordinary 16:9 image, as indicated at the first position from the top of FIG. 2, for example.

The second one from the top of FIG. 2 presents a display example of the 16:9 image, as displayed in a screen mode called the "wide zoom mode".

The "wide zoom mode" is the screen mode, in which the right and left end portions of the 16:9 image are cut so that only the rightward and leftward (or horizontal) directions are enlarged and displayed. In the 16:9 display area of the display, there is displayed the central portion of the image (or the image enlarged in the rightward and leftward image size) which is obtained by enlarging the 16:9 image to the right and left. Thus in the "wide zoom mode", the image enlarged rightward and leftward from the 16:9 image is displayed so that it is suitable for the display of the 16:9 image having the side panels, for example, as indicated at the second position from the top of FIG. 2. Here, the "wide zoom mode" is also suited for the display of the image of the aspect ratio of 4:3, for example.

The third one from the top (or the first one from the bottom) of FIG. 2 presents the display example of the 16:9 image displayed in the screen mode called the "zoom mode".

The "zoom mode" is the screen mode, in which the 16:9 image is cut at its end portions in the rightward and leftward directions and the upward and downward (or vertical) directions so that it is displayed enlarged in both the horizontal and vertical directions. In the 16:9 display area of the display, there is displayed the central portion of the image which is obtained by enlarging the 16:9 image vertically and horizontally (or the image which has its sizes enlarged in the vertical directions and in the horizontal directions). Thus in the "zoom mode", the image having the 16:9 image enlarged vertically and horizontally is displayed, so that the "zoom mode" is suited for the display of the letter box image, as presented at the third position from the top of FIG. 2.

The screen mode can be selected so to speak manually by operating a remote commander attached to the wide TV, for example. Moreover, the wide TV may have a function to select the screen mode automatically and to display the image in the screen mode. This function is called the "auto-wide function".

In the wide TV having the auto-wide function, for example, the screen mode is reselected (as referred to JP-A-08-317303 (Patent Document 1)) when triggered by the switching of the voice mode of the digital broadcasting, that is, by the switching of the voice from one to the other of the stereophonic and monophonic modes.

Alternatively in the wide TV having the auto-wide function, the screen mode is reselected when triggered by the change in the size of the moving-image portion (or the aspect ratio of the moving-image portion) of the image as the television broadcasting program displayed in the display, i.e., by the change of the image format of the image as the television broadcasting program displayed in the display.

Moreover, the reselection of the screen mode is made on the basis of the image format of the image, for example. In case the image to be displayed in the display is the ordinary 16:9 image, for example, the "full mode" is reselected as the screen mode, as presented at the first position from the top of FIG. 2. In case the image to be displayed in the display is the 16:9 image having the side panels or the image having the entire aspect ratio of 4:3, for example, the "wide zoom mode" is reselected as the screen mode, as presented at the second position from the top of FIG. 2. In case the image to be displayed in the display is the letter box image, for example, the "zoom mode" is reselected as the screen mode, as presented at the third position from the top of FIG. 2.

In the wide TV of the related art, the screen mode is reselected, when triggered by the change in the image format of the image to be displayed, as described above, in case the auto-wide function is effective. As a result, the proper display may not be performed.

In the digital broadcasting, the data broadcast may be performed in addition of the TV broadcast with images and voices. In the wide TV, on the other hand, a scaling to reduce the image as the TV broadcasting program may be done to create and display the scaled image and the contents of the data broadcasting in the superposed images.

Figure 3:
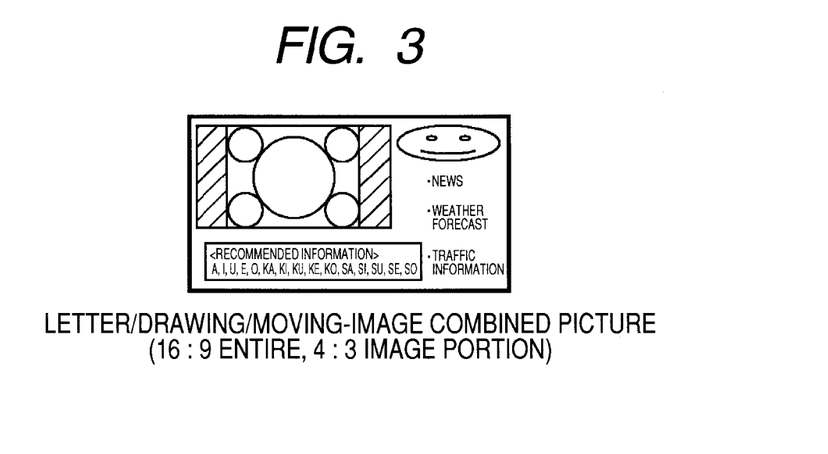
FIG. 3 presents a diagram showing a scaling superposed image.

FIG. 3 shows an example of the image (as will be suitably called the "superposed image"), in which the 16:9 image as the television broadcasting program (or contents) and the contents of the data broadcasting are superposed.

In the superposed image of FIG. 3, the lefthand upper area displays the scaled image (or moving-image) which is prepared by scaling the 16:9 image having the side panels, and the righthand and lower side areas of the scaled image display letters and drawings, for example, as the contents of the data broadcasting.

Here, the data broadcasting contents to be displayed in the superposed image are called the "associated data", for example. In case the data broadcasting of the associated data is performed, whether the image as the television broadcasting program is scaled to display the superposed image of FIG. 3 or whether not the associated data but only the image as the television broadcasting program is displayed is in the wide TV. This display may be designated either by the user to operate the remote commander or with the broadcasting signal of the digital broadcast from the broadcasting station side.

On the other hand, the superposed image is exemplified not only by the superposed image, in which the scaled image of the image as the television broadcasting program and the contents of the data broadcasting are superposed, but also the superposed image, in which the image as the television broadcasting program is not scaled but in which the contents of the data broadcasting are superposed on the nonscaled image. In the following, the superposed image having the scaled image and the data broadcasting contents superposed will be called the "scaling superposed image", and the superposed image having nonscaled image and the data broadcasting contents superposed will be called the "nonscaled superposed image".

Figure 4:
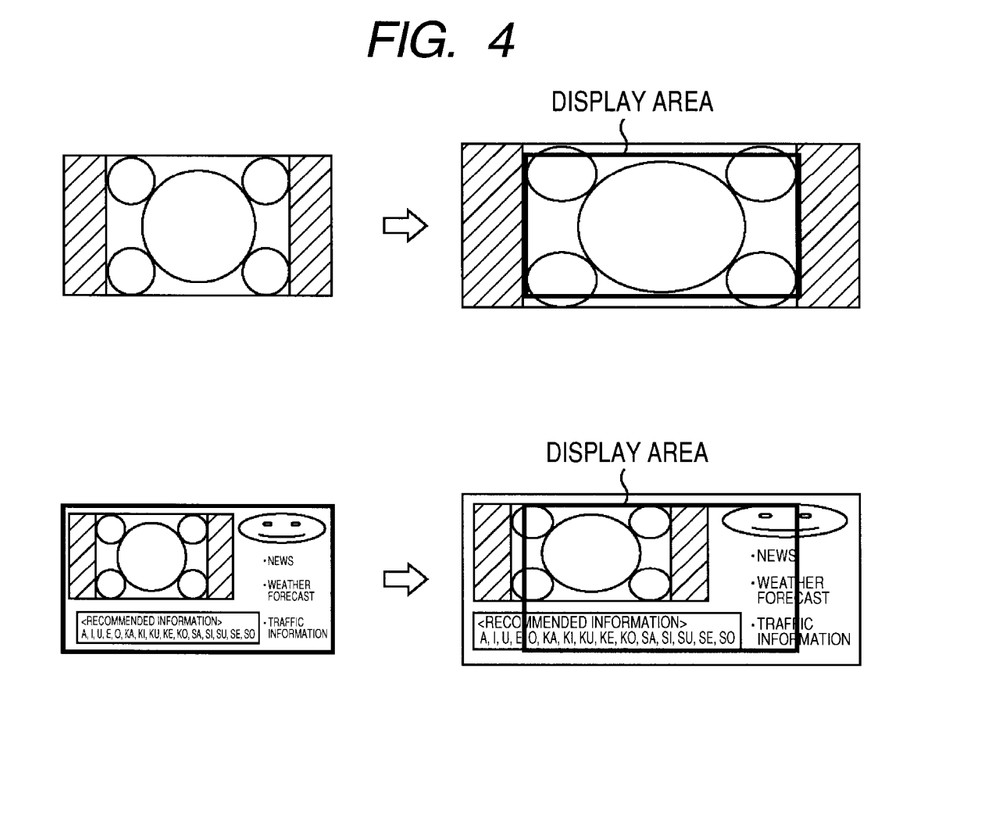
FIG. 4 presents diagrams for explaining the case, in which the scaling superposed image is not properly displayed.
Figure 5:
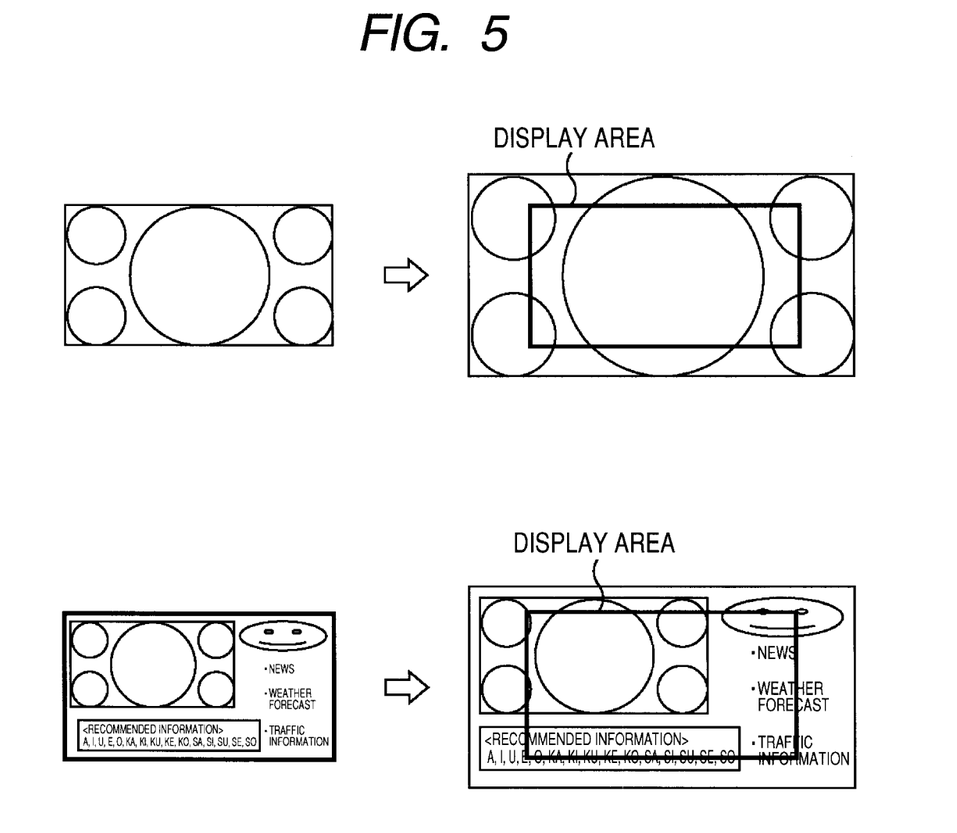
FIG. 5 presents diagrams for explaining the case, in which the scaling superposed image is not properly displayed.

In the wide TV in the related art, the scaling superposed image may not be properly displayed, as shown in FIG. 4 or FIG. 5.

Specifically in case the auto-wide function is effective, as shown on the upper side of FIG. 4, if the image format of the image to be displayed in the display is the side panel 16:9, the "wide zoom mode" is selected as the screen mode on the basis of that image format.

For the side-panel 16:9 image having the image format of the side panel 16:9, therefore, the 16:9 image, in which the image (or the effective moving-image portion) having the central portion of the aspect ratio of 4:3 is expanded rightward and leftward, is displayed in the display area of 16:9 of the display.

In case the display object image or the image to be displayed entirely of the display (or the image to be displayed in the entirety of the display) is changed from the 16:9 image having the side panels to the scaling superposed image of FIG. 3, in which the scaled image scaled from the 16:9 image with the side panels and the associated data are superposed, the image as the television broadcasting program to be displayed in the display is the 16:9 image having the side panels and has its image format unchanged, no matter whether the display object image might be the 16:9 image having the side panels or the scaling superposed image of FIG. 3.

Even if, therefore, the display object image is changed from the 16:9 image having the side panels to the scaling superposed image of FIG. 3, the screen mode is unchanged in the "wide zoom mode". Therefore, the scaling superposed image is enlarged rightwardly and leftwardly and displayed, as shown on the lower side of FIG. 4. As a result, there may occur the letter missing, in which the associated data such as letters in the scaling superposed image is not displayed in the display area of the display.

Even for the ordinary 16:9 image, the user may enlarge and display a portion, that is, may display the ordinary 16:9 image in the "zoom mode", as shown on the upper side of FIG. 5. If the auto-wide function is active (or effective) on the ordinary 16:9 image, the "full mode" is displayed, as shown at the top position from the top of FIG. 2. In order that the ordinary 16:9 image may be displayed in the "zoom mode", the user need make the auto-wide function ineffective and to select the "zoom mode" manually.

In case the auto-wide function is made ineffective so that the ordinary 16:9 image is displayed in the "zoom mode", as described above, the image as the television broadcasting program to be displayed in the display remains the ordinary 16:9 image, even if the display object image is changed from the ordinary 16:9 image to the scaling superposed image, in which the scaled image scaled from the ordinary 16:9 image and the associated data are superposed. Therefore, the screen mode remains in the "zoom mode". Therefore, the scaling superposed image is enlarged vertically and horizontally and displayed, as shown on the lower side of FIG. 5. As a result, as in the case of FIG. 4, there may occur the letter missing, in which the associated data such as the letters in the scaling superposed image is not displayed in the display area of the display.

The scaling superposed image is the 16:9 image, in which the scaled image and the associated data are displayed in their entirety, and the display of the scaling superposed image is proper when it is made in the "full mode". When the scaling superposed image is to be displayed in the "full mode" in the case of FIG. 4 or FIG. 5, however, the user need switch the screen mode manually into the "full mode", thus, it is troublesome.

The present invention has been conceived in view of the situations thus far described, and contemplates to display an image properly.

SUMMARY OF THE INVENTION

According to one embodiment of the invention, there is provided a display control device for controlling the display of an image in a display device. The display control device includes decision means for deciding whether the state of a scaling of a moving-image portion in a display object image or an image to be displayed in the display device has changed;

and display control means for selecting a screen mode for displaying the display object image in response to the change in scaling state of the moving-image portion in the display object image, and for displaying the display object image in the screen mode in the display device.

In the display control device, the display control means selects the screen mode for displaying the display object image based on entire aspect information expressing the entire aspect ratio of the display object image.

According to another embodiment of the invention, there is provided a display control method for controlling the display of an image in a display device or a program for causing a computer to perform a display control process for controlling the display of an image in a display device. The method and program include deciding whether the state of a scaling of a moving-image portion in a display object image or an image to be displayed in the display device has changed; and selecting a screen mode for displaying the display object image in response to the change in the scaling state of the moving-image portion in the display object image, and displaying the display object image in the screen mode in the display device.

In a display control device, a display control method or a program according to one aspect of the invention, it is decided whether the state of a scaling of a moving-image portion in a display object image or an image to be displayed in the display device has changed, and the selection of a screen mode, in which the display object image is displayed, is triggered with the change in the scaling state of the moving-image portion in the display object image, thereby to display the display object image in the screen mode in the display device.

According to one embodiment of the invention, the image can be properly displayed.

DETAILED DESCRIPTION

Embodiments of the invention are described in the following. The corresponding relations between the constituents of the invention and the embodiments, as described herein and in the drawings, are exemplified in the following. This description confirms that the embodiments supporting the invention are disclosed in the specification and the drawings. Therefore, even if there are embodiments disclosed in the specification or the drawings but not described herein as the embodiments corresponding to the constituents, it is not intended that the embodiments do not correspond to the constituents. Even if the embodiments are disclosed to correspond to the constituents, on the contrary, it is not meant that the embodiments do not correspond to the others of those constituents.

According to one aspect of the invention, a display control device (e.g., a control device of FIG. 7) for performing a display control to display an image in a display device (e.g., an image display device 26V of FIG. 6) includes decision means (e.g., a decision unit 51 of FIG. 7) configured to decide whether or not the state of a scaling of a moving-image portion in a display object image or an image to be displayed in the display device has changed; and display control means (e.g., a display control unit 52 of FIG. 7) configured to be triggered with the change in the scaling state of the moving-image portion in the display object image, for selecting a screen mode, in which the display object image is displayed, thereby to display the display object image in the screen mode in the display device.

According to one embodiment of the invention, there is a display control method for performing a display control to display an image in a display device (e.g., an image display device 26V of FIG. 6) or a program for causing a computer (e.g., a CPU 12 of FIG. 6) to perform a display control process thereby to display an image in a display device. The method and process include deciding (e.g., at Step S1 of FIG. 9) whether or not the state of a scaling of a moving-image portion in a display object image or an image to be displayed in the display device has changed; and triggering (e.g., at Step S4 of FIG. 9) the selection of a screen mode, in which the display object image is displayed, with the change in the scaling state of the moving-image portion in the display object image, thereby to display the display object image in the screen mode in the display device.

An embodiment of the invention is described in the following with reference to the accompanying drawings.

Figure 6:
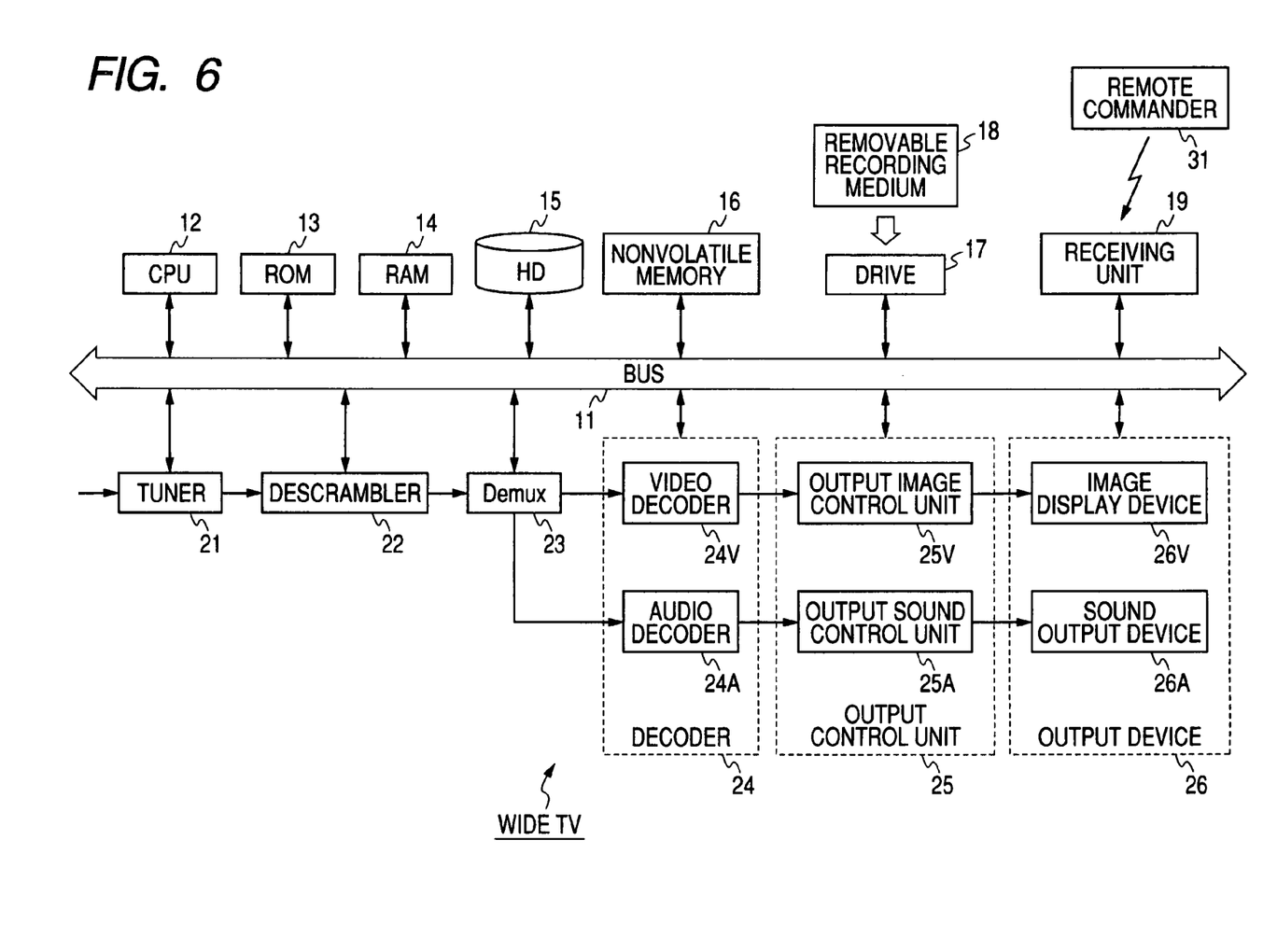
FIG. 6 is a block diagram showing an example of the constitution of one embodiment of a wide TV, to which an embodiment of the invention is applied.

FIG. 6 shows an example of the constitution of the embodiment of a wide TV, to which an embodiment of the invention is applied.

In FIG. 6, the wide TV is constituted to include a CPU (Central Processing Unit) 12, a ROM (Read Only Memory) 13, a RAM (Random Access Memory) 14, an HD (Hard Disk) (HD drive) 15, a nonvolatile memory 16, a drive 17, a receiving unit 19, a tuner 21, a descrambler 22, a demultiplexer (Demux) 23, a decoder 24, an output control unit 25, and an output device 26, which are connected with each other through a bus 11.

The CPU 12 reads out and executes the programs, which are stored in the ROM 13, the HD 15 and the nonvolatile memory 16, through the bus 11, thereby to control the individual blocks constituting the wide TV.

The ROM 13 is stored with the programs or the like, which are executed by the CPU 12. The RAM 14 is temporarily stored with the programs to be executed by the CPU 12, and the data necessary for the operations of the CPU 12. The HD 15 records the programs to be executed by the CPU 12, and the data or the like necessary for executing the programs.

The nonvolatile memory 16 is stored, for example, with the data which need to be held even if the power source of the wide TV is turned OFF. Here, the data, which need to be held even if the power source of the wide TV is turned OFF, is exemplified by the data indicating the channel, which has been selected (or tuned) by the tuner 21 just before the power source is turned OFF, or the data indicating the sound volume just before the power source is turned OFF. When the power source of the wide TV is then turned ON, the channel is selected, or the volume is set on the basis of the data stored in the nonvolatile memory 16. Here, this nonvolatile memory 16 is further stored, if necessary, with the data such as the key to be used for the descrambling operation at the descrambler 22.

The drive 17 can be removably loaded with a removable recording medium 18 such as flexible disk, a CD-ROM (Compact Disc Read Only Memory), an MO (Magneto Optical) disc, a DVD (Digital Versatile Disc), a magnetic disk or a semiconductor memory. The drive 17 reads/writes data from/in the removable recording medium 18 loaded therein.

The receiving unit 19 receives an operation signal sent through an infrared ray or the like from a remote commander 31. Specifically, the remote commander 31 transmits, when operated by the user, an operation signal responding to the operation, wirelessly through infrared rays. The receiving unit 19 receives the operation signal thus transmitted from the remote commander 31, and feeds it to the CPU 12 through the bus 11. In response to the operation signal from the receiving unit 19, the CPU 12 controls the selection of the channel or the like by the tuner 21.

The tuner 21 is fed with the broadcasting signal of the digital broadcasting received by the not-shown antenna. Under the control of the CPU 12 through the bus 11, the tuner 21 demodulates the broadcasting signal of the desired channel from the broadcasting signal fed thereto, and feeds the (array of) packets obtained as a result of the demodulation, to the descrambler 22.

The descrambler 22 descrambles, if necessary, according to the control of the CPU 12 through the bus 11, the scrambled packet fed from the tuner 21, and feeds the descrambled packet to the demultiplexer 23.

The demultiplexer 23 extracts, according to the control of the CPU 12 through the bus 11, the necessary (array of) packets from the packet fed from the descrambler 22, and feeds the packet containing the image data and the packet containing the voice data to the decoder 24, and the packet containing the data of the data broadcast to the CPU 12 through the bus 11.

Here, the CPU 12 processes, if necessary, the data of the data broadcast, as contained in the packet fed from the demultiplexer 23 through the bus 11, and feeds the processed data through the bus 11 to an output image control unit 25V of the output control unit 25. The output image control unit 25V creates the superposed image or the like containing letters and drawings by using the data from the CPU 12.

The decoder 24 includes a vide decoder 24V and an audio decoder 24A, and is controlled by the CPU 12 through the bus 11 thereby to decode the data contained in the packet from the demultiplexer 23, according to the MPEG (Moving Picture Experts Group) method and to feed the decoded data to the output control unit 25.

Specifically in the decoder 24, the video decoder 24V decodes the image data contained in the packet from the demultiplexer 23, and feeds the decoded data to the output image control unit 25V of the output control unit 25. On the other hand, the audio decoder 24A decodes the voice data contained in the packet from the demultiplexer 23, and feeds the decoded data to an output voice control unit 25A of the output control unit 25.

The output control unit 25 includes the output image control unit 25V and the output voice control unit 25A, and controls the output of the image data and the voice data to the output device 26, in accordance with the control of the CPU 12 through the bus 11.

In accordance with the control of the CPU 12 through the bus 11, specifically, the output image control unit 25V processes the image data from the video decoder 24V so that the image may be displayed in a predetermined screen mode, and feeds the processed image data to an image display device 26V of the output device 26. In addition, the output image control unit 25V also performs the processing to create the image data of the superposed image such as the aforementioned scaling superposed image of FIG. 3, by using the data broadcast data fed from the CPU 12 through the bus 11 and the image data from the video decoder 24V.

According to the control of the CPU 12 through the bus 11, the output voice control unit 25A adjusts the level of the voice data from the audio decoder 24A, and feeds the adjusted voice data to a voice output device 26A of the output device 26.

The output device 26 includes the image display device 26V and the voice output device 26A, and displays the image corresponding to the image data from the output control unit 25 and outputs the voice corresponding to the voice data from the output control unit 25.

The image display device 26V is constituted to include a display such as a CRT (Cathode Ray Tube) or an LCD (Liquid Crystal Display), and displays the image corresponding to the image data from the output image control unit 25V. Here, the image display device 26V has a display area (or a display screen) capable of displaying a 16:9 image, for example.

The voice output device 26A is constituted to include a D/A (Digital/Analog) converter, a speaker and so on, and outputs a voice corresponding to the voice data from the output voice control unit 25A.

In the wide TV thus constituted, the tuner 21 demodulates the broadcasting signal of the desired channel from the broadcasting signal fed thereto, and feeds the package obtained as a result of the demodulation, to the descrambler 22. This descrambler 22 descrambles, if necessary, the packet fed from the tuner 21, and feeds the descrambled packet to the demultiplexer 23.

The demultiplexer 23 extracts the necessary ones of the (array of) packets fed from the descrambler 22, and feeds the packet containing the image data to the video decoder 24V, the packet containing the voice data to the audio decoder 24A, and the packet containing the data of the data broadcast to the CPU 12.

The video decoder 24V decodes the image data contained in the packet from the demultiplexer 23, and feeds the decoded data to the output image control unit 25V. The audio decoder 24A decodes the voice data contained in the packet from the demultiplexer 23, and feeds the decoded data to the output voice control unit 25A.

The output image control unit 25V processes the image data from the video decoder 24V so that the image may be displayed in a predetermined screen mode, and feeds the processed data to the image display device 26V. As a result, the image display device 26V displays the image in a predetermined screen mode.

On the other hand, the output voice control unit 25A processes the voice data from the audio decoder 24A, and feeds the processed data to the voice output device 26A. As a result, the voice output device 26A outputs the voice.

Here, the programs to be executed by the CPU 12 can be recorded in advance in the ROM 13, the HD 15 and the nonvolatile memory 16.

Alternatively, the programs can be temporarily or permanently stored (or recorded) in the removable recording medium 18. This removable recording medium 18 can be provided as the so-called "package software".

Here, the programs not only can be installed in the wide TV from the removable recording medium 18 thus far described but also can be either wirelessly transferred to the wide TV through digital satellite broadcasting artificial satellites or wiredly to the wide TV through the networks such as the LAN (Local Area Network) and the internet. This wired TV can receive the programs thus transferred, by the not-shown communication interface, and can install the received programs in the built-in HD 15.

Herein, the processing steps describing the programs for causing the CPU 12 as a computer to perform various operations need not typically be processed in time series according to the orders later-described as the flow chart, but contain the operations (e.g., the parallel operations or the object operations) to be executed in parallel or individually.

Moreover, the programs may be either processed by one CPU or distributed by a plurality of CPU.

Next, in the wide TV of FIG. 6, the CPU 12 functions as a control device to make controls on the screen mode, by executing a predetermined control program.

Figure 7:
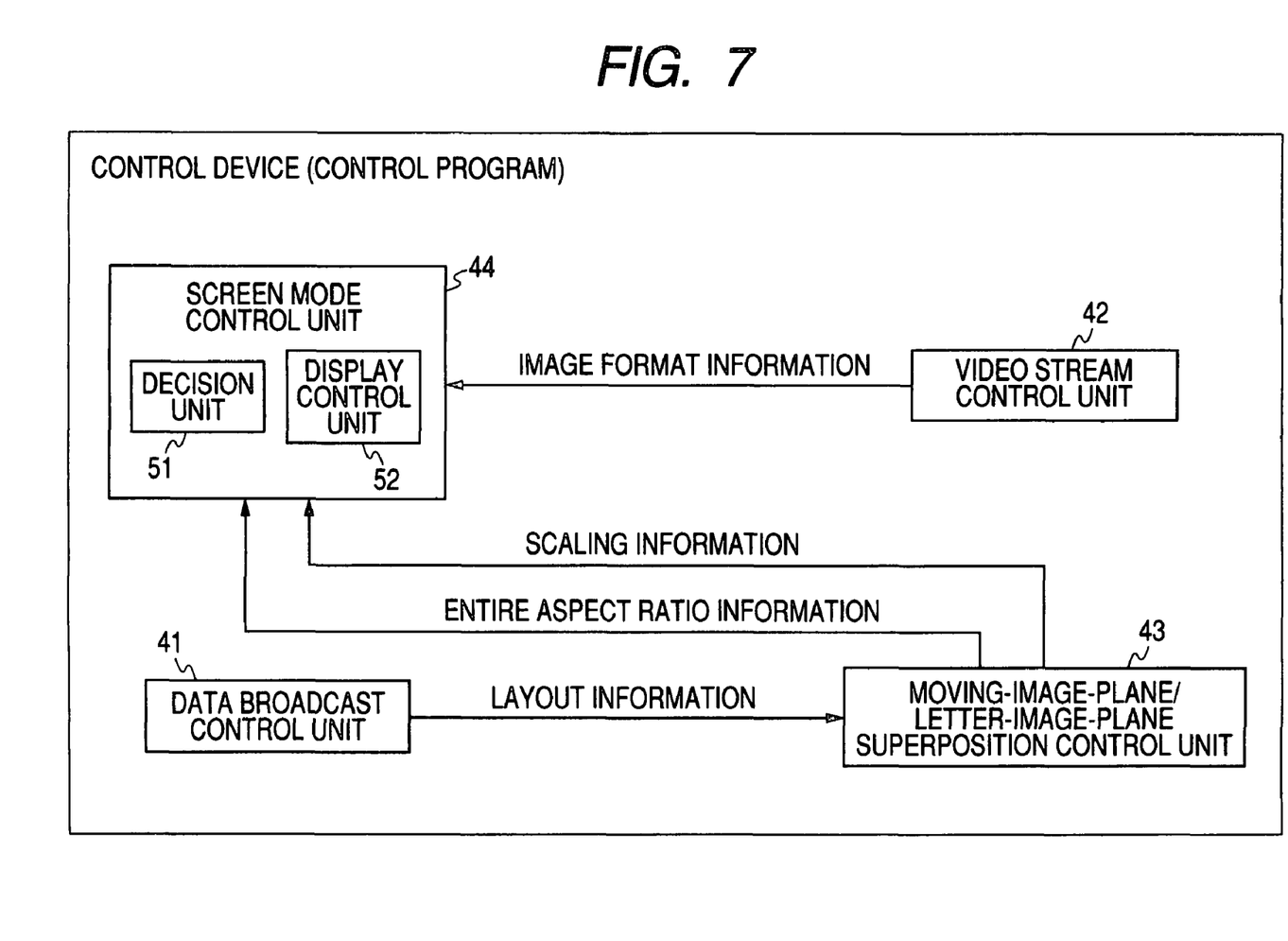
FIG. 7 is a block diagram showing an example of a functional constitution of a control device, which is (virtually) realized by the execution of programs by a CPU 12.

FIG. 7 shows an example of the functional configuration of such control device.

In FIG. 7, the control device is constituted to include a data broadcast control unit 41, a video stream control unit 42, a moving-image-plane/letter-image-plane superposition control unit 43, and a screen mode control unit 44.

The data broadcast control unit 41 makes controls on the data broadcast. Specifically, the data broadcast control unit 41 sets (or decides) the layout the letters or drawings as the data broadcast programs, for example, on the basis of the data of the data broadcast, and feeds the layout information expressing that layout to the moving-image-plane/letter-image-plane superposition control unit 43.

The video stream control unit 42 controls the video decoder 24V, the output image control unit 25V and so on for processing the image data, of the blocks constituting the wide TV. Moreover, the video stream control unit 42 detects the image format of the image as the TV broadcast program, and feeds the image format information expressing that image format, to the screen mode control unit 44.

Here, the image format to be expressed by the image format information includes the aforementioned ordinary 16:9, a wide panel 16:9, a letter box 16:9, and an ordinary 4:3 or an image format of an image having an aspect ratio of 4:3.

The moving-image-plane/letter-image-plane superposition control unit 43 makes such a control in the output image control unit 25V (FIG. 6), in case the display object image to be displayed in the image display device 26V is the superposed image, as is necessary for creating the superposed image in which an image as the TV broadcast program and a letter and a drawing as the data broadcast program are superposed. Here, the moving-image-plane/letter-image-plane superposition control unit 43 controls, when it creates the superposed image, the arranging positions of the letter and the drawing as the data broadcast program on the basis of the layout information from the data broadcast control unit 41.

In case the display object image is the scaling superposed image, the moving-image portion of the display object image or the scaling superposed image, that is, the image to be superposed as the TV broadcast program on the scaling superposed image is scaled to reduce its image size. This scaling is done by the output image control unit 25V of FIG. 6 according to the control of the moving-image-plane/letter-image-plane superposition control unit 43. This moving-image-plane/letter-image-plane superposition control unit 43 recognizes the scaling state of the moving-image portion of the display object image, i.e., the state on whether the moving-image portion is scaled or not, and feeds the scaling information indicating the scaling state, regularly or irregularly to the screen mode control unit 44.

In case the display object image is the superposed image, moreover, the moving-image-plane/letter-image-plane superposition control unit 43 detects the entire aspect ratio of the superposed image or the display object image, and feeds the entire aspect ratio information expressing that aspect ratio to the screen mode control unit 44.

The screen mode control unit 44 includes the decision unit 51 and the display control unit 52, and selects the screen mode and controls the output image control unit 25V (FIG. 6) so that the image may be displayed in the selected screen mode.

On the basis of the scaling information from the moving-image-plane/letter-image-plane superposition control unit 43, specifically, the decision unit 51 decides whether or not the scaling state of the moving-image portion in the display object image has changed.

For example, the decision unit 51 is stored in its (not-shown) built-in memory with the previous scaling information fed at the last time from the moving-image-plane/letter-image-plane superposition control unit 43, and compares the previous scaling information stored in the memory and the current scaling information fed at this time from the moving-image-plane/letter-image-plane superposition control unit 43, thereby to decide whether or not the scaling state of the moving-image portion in the display object image has changed, that is, whether or not the current scaling information is different from the scaling information of the last time.

Moreover, the decision unit 51 feeds, in case it decides that the scaling state of the moving-image portion in the display object image has changed, such a scaling state to the display control unit 52 as either the message (as will be suitably called the "scaling presence→absence" message) expressing the change of the moving-image portion of the display object image from the scaled state to the nonscaled state, or the message (as will be suitably called the "scaling absence→presence" message) expressing the change of the moving-image portion of the display object image from the nonscaled state to the scaled state.

Still moreover, the decision unit 51 causes the built-in memory to store the scaling information of this time in an overwritten form.

The display control unit 52 selects, when fed with the message from the decision unit 51, the screen mode to display the display object image, as triggered by the feed of the message, i.e., by the change in the scaling state of the moving-image portion in the display object image, and controls the output image control unit 25V so that the display object image may be displayed in that screen mode in the image display device 26V.

Here, the display control unit 52 selects the screen mode on the basis of either the image format information fed from the video stream control unit 42 or the entire aspect ratio information fed from the moving-image-plane/letter-image-plane superposition control unit 43.

Figure 8:
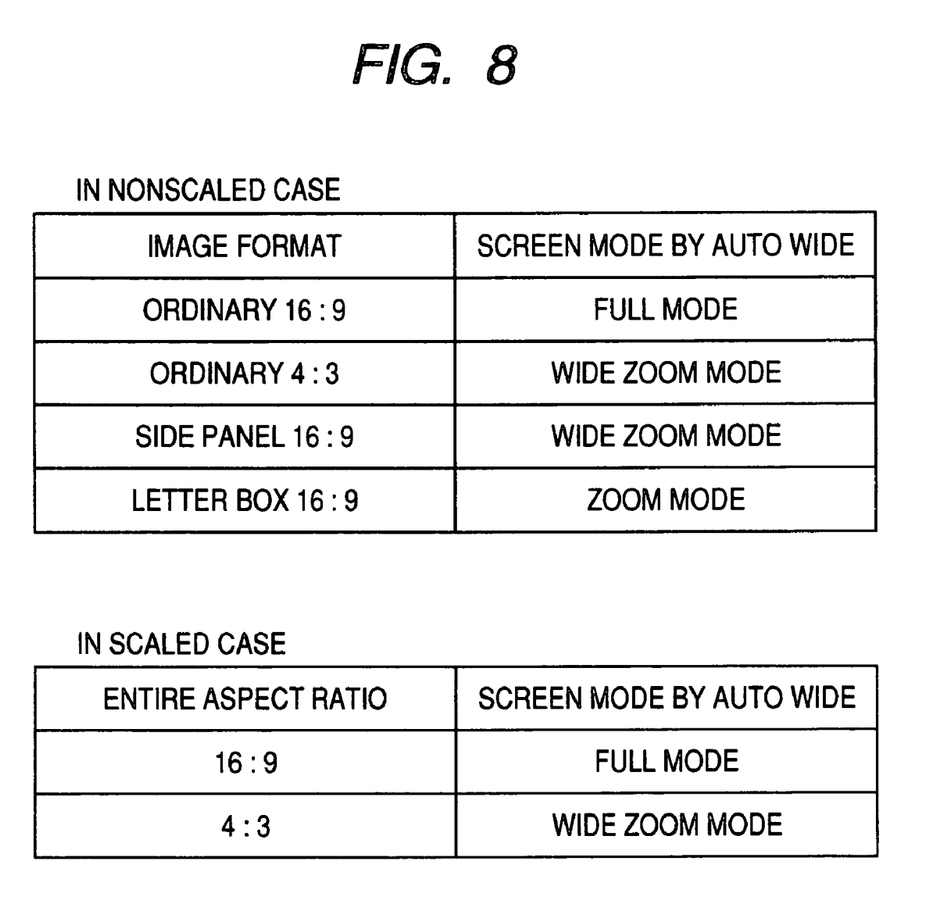
FIG. 8 presents diagrams showing relations between either image format information or entire aspect ration information and the screen mode selected by a display control unit 52.

Specifically, FIG. 8 presents diagrams showing relations between either the image format information or the entire aspect ration information and the screen mode selected by the display control unit 52.

In case the moving-image portion in the display object image is not scaled, that is, in case the "scaling presence→absence" message is fed from the decision unit 51 to the display control unit 52, this display control unit 52 selects the screen mode, as shown on the upper side of FIG. 8, on the basis of the image format information which is fed from the video stream control unit 42 and which expresses the image format of the display object image (containing the ordinary 16:9 image or the entire moving-image portion) containing the nonscaled moving-image portion.

Specifically, the display control unit 52 selects the "full mode" as the screen mode, in case the image format expressed by the image format information is the ordinary 16:9. On the other hand, the display control unit 52 selects the "wide zoom mode" as the screen mode, in case the image format expressed by the image format information is the ordinary 4:3 or the side panel 16:9. Moreover, in case the image format expressed by the image format information is the letter box, the display control unit 52 selects the "zoom mode" as the screen mode in case the image format expressed by the image format information is the letter box.

On the other hand, in case the moving-image portion in the display object image is scaled, that is, in case the "scaling absence→presence" message is fed from the decision unit 51 to the display control unit 52, this display control unit 52 selects the screen mode, as shown in the lower side of FIG. 8, on the basis of the entire aspect ratio information which is fed from the moving-image-plane/letter-image-plane superposition control unit 43 and which expresses the entire aspect ratio of the display object image containing the scaled moving-image portion.

Specifically, the display control unit 52 selects the "full mode" as the screen mode, in case the aspect ratio (as will be suitably called the "entire aspect ratio") expressed by the entire aspect ratio information is the ordinary 16:9. On the other hand, the display control unit 52 selects the "wide zoom mode" as the screen mode, in case the entire aspect ratio is 4:3.

Next, the operations of the screen mode control unit 44 of the control device of FIG. 7 are described with reference to the flow chart of FIG. 9.

The decision unit 51 of the screen mode control unit 44 advances, awaiting the feed of the scaling information from the moving-image-plane/letter-image-plane superposition control unit 43, to Step S1, at which it is decided on the basis of the scaling information whether or not the scaling state of the moving-image portion in the display object image has changed.

Specifically, the decision unit 51 compares at Step S1 the previous scaling information stored in the built-in memory and the current scaling information fed from the moving-image-plane/letter-image-plane superposition control unit 43, thereby to decide whether or not the scaling state of the moving-image portion in the display object image has changed, that is, whether or not the scaling information of this time is different from the scaling information of the last time.

In case it is decided at Step S1 that the scaling state of the moving-image portion in the display object image has not changed, namely, that the scaling information of this time is identical to that of the last one, the decision unit 51 returns, awaiting the new feed of the scaling information from the moving-image-plane/letter-image-plane superposition control unit 43, to the Step S1, and similar operations are then repeated. In case the scaling information of this time is identical to that of last time, the stored contents of the memory built in the decision unit 51 can be used as they are as the scaling information, so that the decision unit 51 does not (or need not) update the stored contents of the memory.

In case it is decided at Step S1 that the scaling state of the moving-image portion in the display object image has changed, namely, that the scaling information of this time is different from that of the last time, the flow chart advances to Step S2 or Step S11.

Specifically, in case the moving-image portion of the display object image has changed from the nonscaled state to the scaled state, that is, the display object image has changed from the image other than the superposed image to the scaling superposed image of FIG. 3 or the like, the flow chart advances from Step S1 to Step S2, at which the decision unit 51 stores the built-in memory with the scaling information of this time in the overwritten form. Here, the scaling information stored in the memory is used as that of the last time in the operation of the next Step S1.

After this, the decision unit 51 feeds the "scaling absence→presence" message to the display control unit 52, and the flow chart advances from Step S2 to Step S3. At Step S3, the display control unit 52 acquires the entire aspect ratio information from the moving-image-plane/letter-image-plane superposition control unit 43, and the flow chart advances to Step S4.

At Step S4, the display control unit 52 is triggered by the feed of the "scaling absence→presence" message from the decision unit 51, and performs an auto-wide processing for the auto-wide function.

Specifically at Step S4, the display control unit 52 selects the screen mode at Step $S4_1$, as described with reference to FIG. 8, on the basis of the entire aspect ratio which is expressed by the entire aspect ratio information acquired from the moving-image-plane/letter-image-plane superposition control unit 43, and the flow chart advances to Step $S4_2$.

At Step $S4_2$, the display control unit 52 controls the output image control unit 25V so that the image may be displayed in the screen mode selected at the Step $S4_1$ of the last time. As a result, the output image control unit 25V enlarges or reduces the display object image, if necessary, so that the image may be displayed in the screen mode selected at Step $S4_1$ of the last time, and feeds and displays the display object image to and in the image display device 26V.

On the other hand, in case the display object image changes from the scaled state of the moving-image portion to the nonscaled state, that is, in case the display object image is changed from the scaling superposed image of FIG. 3 or the like to the image other than the superposed image, the flow chart advances from the Step S1 to the Step S11, at which the decision unit 51 causes the built-in memory to store the scaling information of this time in the overwriting form as in the case of Step S2.

After this, the decision unit 51 feeds the "scaling presence→absence" message to the display control unit 52, and the flow chart advances from Step S11 to Step S12. At this Step S12, the display control unit 52 acquires (or receives) the image format information from the video stream control unit 42, and the flow chart advances to Step S13.

At Step S13, the display control unit 52 is triggered by the feed of the "scaling presence→absence" message from the decision unit 51, to performs the auto wide processing.

In short, Step S13 basically performs the processing like that of the case of Step S4. However, the screen mode is selected on the basis of not the entire aspect ratio expressed by the entire aspect ratio information but the image format expressed by the image format information.

Specifically at Step S13, the display control unit 52 selects, as described with reference to FIG. 8, the screen mode on the basis of the image format which is expressed by the image format information acquired from the video stream control unit 42, and controls the output image control unit 25V so that the image may be displayed in that screen mode. As a result, the output image control unit 25V enlarges or reduces the display object image, if necessary, so that the image may be displayed in the screen mode selected by the display control unit 52, and feeds and displays the display object image to and in the image display device 26V.

After the operation of Step S4 or Step S13, the flow chart returns, awaiting the new feed of the scaling information from the moving-image-plane/letter-image-plane superposition control unit 43 to the decision unit 51, to Step S1, and similar operations are then repeated.

Thus in the screen mode control unit 44, it is decided whether or not the scaling state of the moving-image portion in the display object image has changed. In case the moving-image portion in the display object image has changed from the nonscaled state to the scaled state, the screen mode for displaying the display object image is selected by the trigger of the change in the scaling state on the basis of the entire aspect ratio information, so that the display object image is displayed in that screen mode. In other words, the auto-wide processing is performed without any change of the image format of the display object image, so that the image especially the superposed image can be properly displayed.

Figure 10:
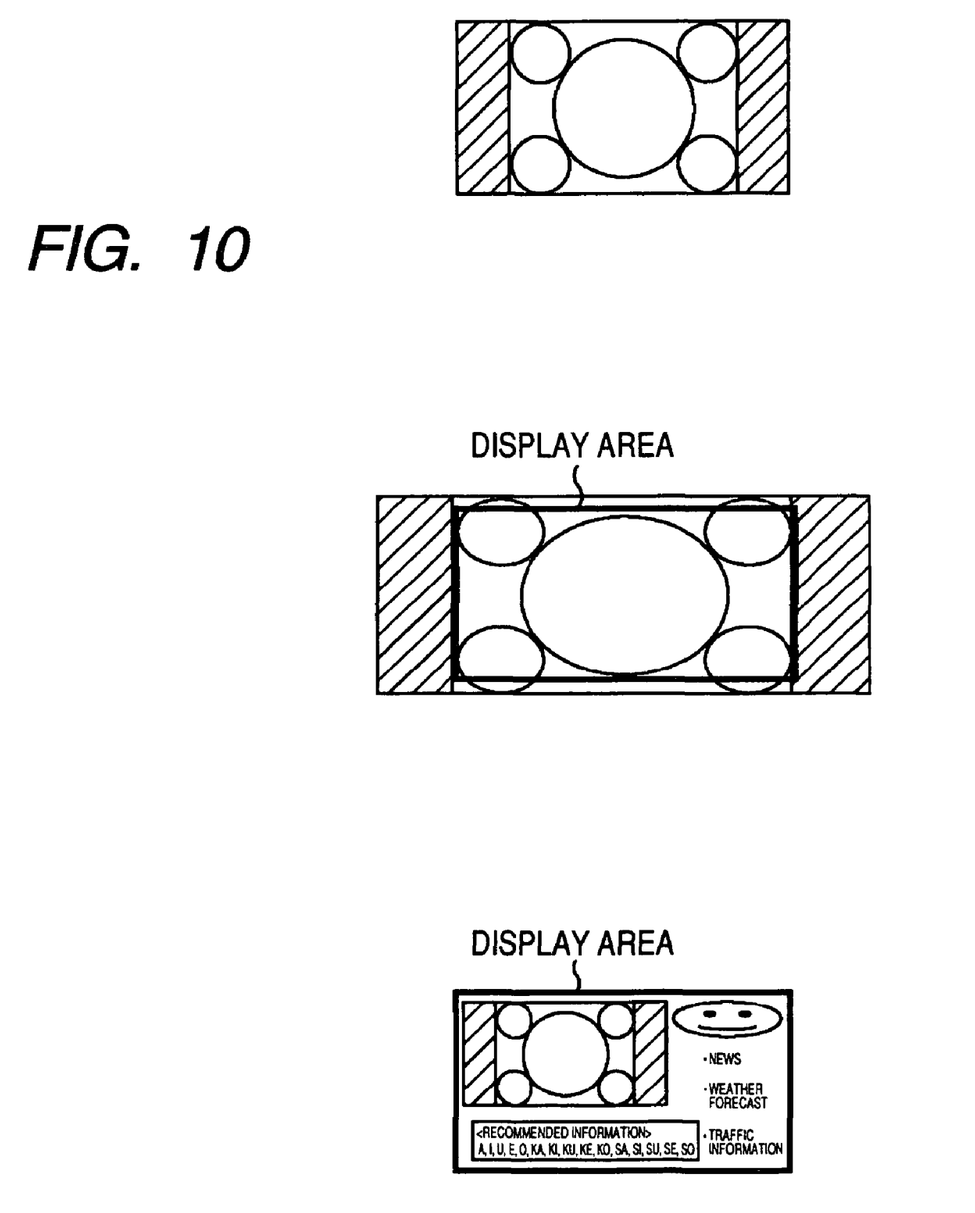
FIG. 10 presents diagrams for explaining that the scaling superposed image is properly displayed.

For example, the display object image is the 16:9 image having the side panels, as shown at the first position from the top of FIG. 10. In case the display object image is displayed in the screen mode of the "wide zoom mode", as shown at the second position from the top of FIG. 10, it is assumed that the display object image is changed to the scaling superposed image having an entire aspect ratio of 16:9, in which the scaled image scaled from the 16:9 image with the side panels and the associated data are superposed.

Figure 9:
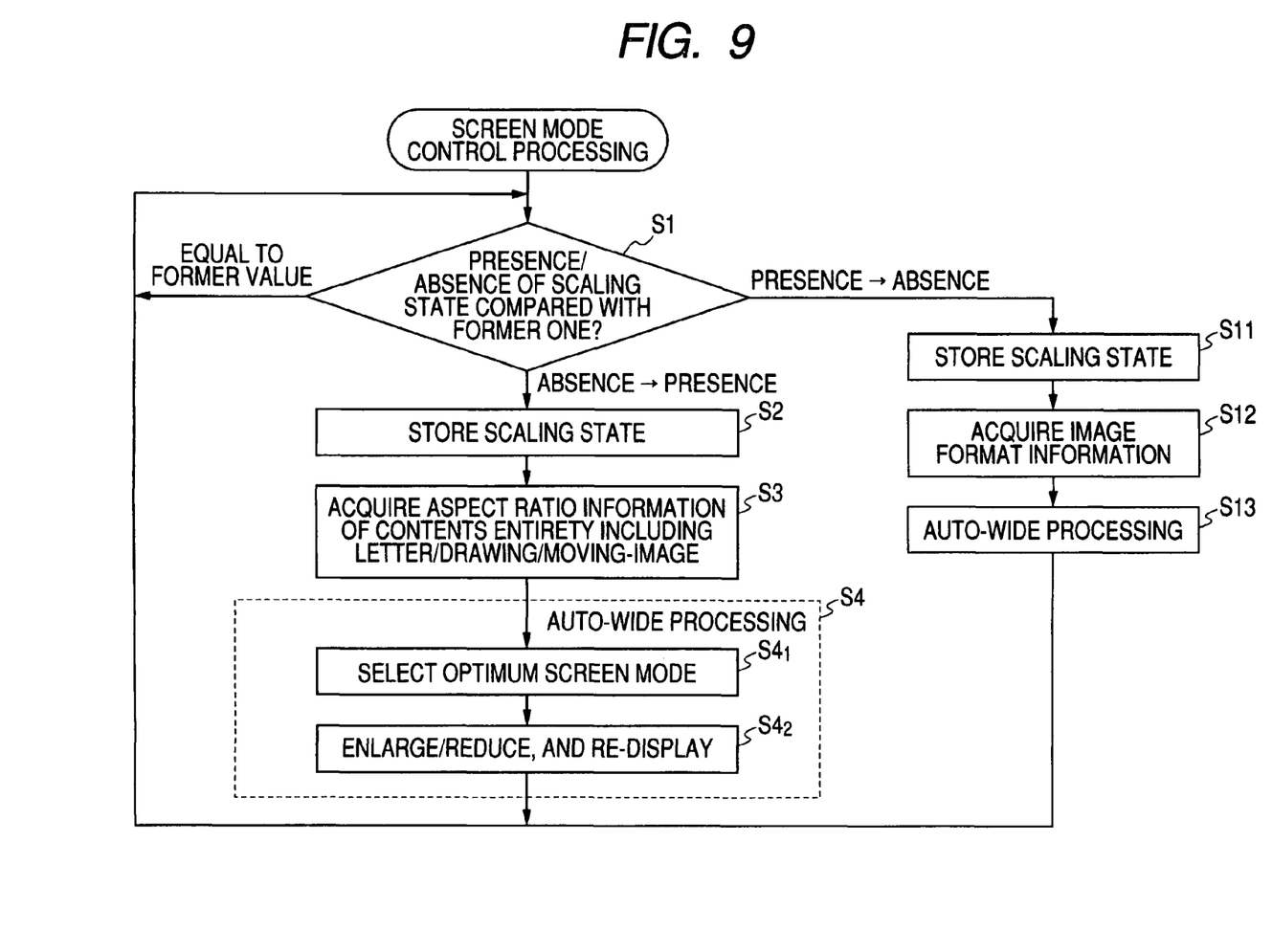
FIG. 9 is a flowchart for explaining the operations of an image mode control unit 44.

When the display object image is changed from the 16:9 image with the side panels to the scaling superposed image, the message of "scaling absence→presence" message is fed from the decision unit 51 to the display control unit 52, and the display control unit 52 is triggered by the "scaling absence→presence" message to start the auto-wide processing of Step S4 in FIG. 9.

In the auto-wide processing of Step S4, the screen mode is selected, as described with reference to FIG. 8, on the basis of the entire aspect ratio of 16:9 of the scaling superposed image or the display object image. In this case, therefore, the "full mode" is selected as the screen mode.

As a result, the scaling superposed image of the aspect ratio of 16:9 is displayed as it is in the display area of 16:9 of the image display device 26V. Therefore, the scaling superposed image of the aspect ratio of 16:9 is properly displayed without any letter missing, as described with reference to FIG. 4.

Figure 11:
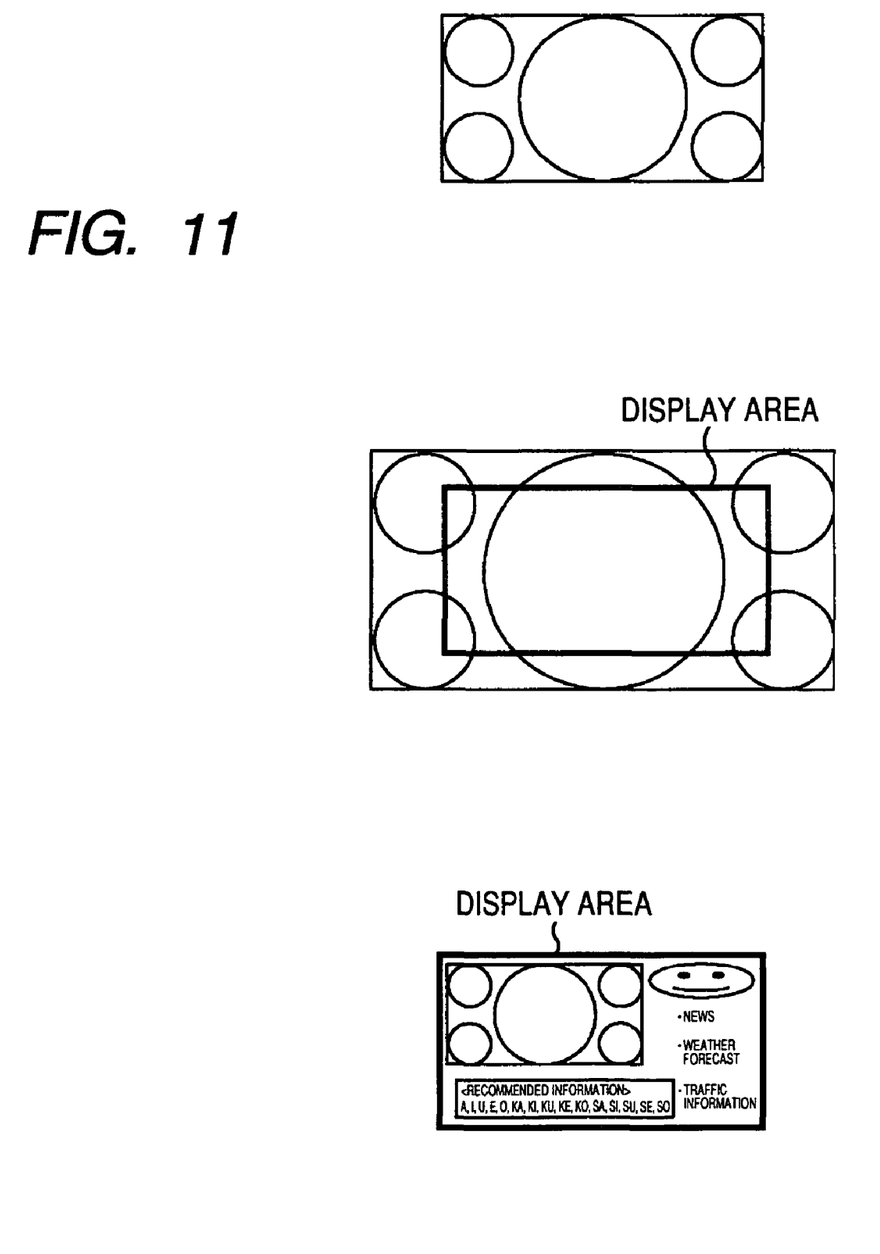
FIG. 11 presents diagrams for explaining that the scaling superposed image is properly displayed.

For example, the display object image is the ordinary 16:9, as shown at the first position from the top of FIG. 11, and the screen mode is displayed in the "zoom mode", as shown at the second position from the top of FIG. 11. In this case, it is assumed that the display object image is changed to the scaling superposed image having the entire aspect ratio of 16:9, in which the image scaled from the ordinary 16:9 image and the associated data are superposed, as shown at the third position from the top of FIG. 11.

When the display object image is changed from the ordinary 16:9 image to the scaling superposed image, the message of "scaling absence→presence" message is fed from the decision unit 51 to the display control unit 52, and the display control unit 52 is triggered by the "scaling absence→presence" message to start the auto-wide processing of Step S4 in FIG. 9.

In the auto-wide processing of Step S4, the screen mode is selected, as described with reference to FIG. 8, on the basis of the entire aspect ratio of 16:9 of the scaling superposed image or the display object image. In this case, therefore, the "full mode" is selected as the screen mode.

As a result, even if the user does not change the screen mode manually to the "full mode", the scaling superposed image of the aspect ratio of 16:9 is displayed as it is in the display area of 16:9 of the image display device 26V. Therefore, the scaling superposed image of the aspect ratio of 16:9 is properly displayed without any letter missing, as described with reference to FIG. 4.

In case the entire aspect ratio of the scaling superposed image or the display object image is 4:3, for example, in the auto-wide processing of Step S4, the screen mode of the "wide zoom mode" is selected on the basis of the entire aspect ratio of 4:3 of the display object image, as has been described with reference to FIG. 8.

As a result, the scaling superposed image of the aspect ratio of 4:3 is horizontally enlarged to the aspect ratio of 16:9 so that it is displayed in the display area of 16:9 of the image display device 26V. In this case, too, the scaling superposed image is so properly displayed as to have no letter missing.

In case the moving-image portion in the display object image changes from the scaled state to the nonscaled state, the screen mode to display the display object image is triggered in the auto-wide processing of Step S13 by the change in the scaling state on the basis of the image format information, so that the display object image is displayed in that screen mode. As a result, it is also possible to display the image properly and to display the moving image properly as the TV broadcasting program.

In case the moving-image portion in the display object image changes from the scaled state to the nonscaled state, more specifically, the screen mode of the "full mode" is selected if the image format expressed by the image format information of the display object image is the ordinary 16:9, as shown on the upper side of FIG. 8. In case the image format expressed by the image format information of the display object image is either the ordinary 4:3 or the side panel 16:9, the screen mode of the "wide zoom mode" is selected. Moreover, the screen mode of the "zoom mode" is selected, in case the image format expressed by the image format information of the display object image is the letter box.

In the display object image of any image format, therefore, the moving-image portion in the display object image is displayed entirely of the display area of 16:9 of the image display device 26V.

Here, the display control unit 52 is enabled to perform the auto-wide processing by using as the trigger not the change in the scaling state of the moving-image portion in the display object image but that the display object image does and does not become the superposed image, namely, that the display object image changes from one of the images, in which the data of the data broadcast is superposed and not, to the other.

In case, however, the auto-wide processing is performed by using it as the trigger that the display object image does and does not become the superposed image, the auto-wide processing is performed without any change in the scaling state, when the display object image does or does not become the superposed image.

Figure 12:
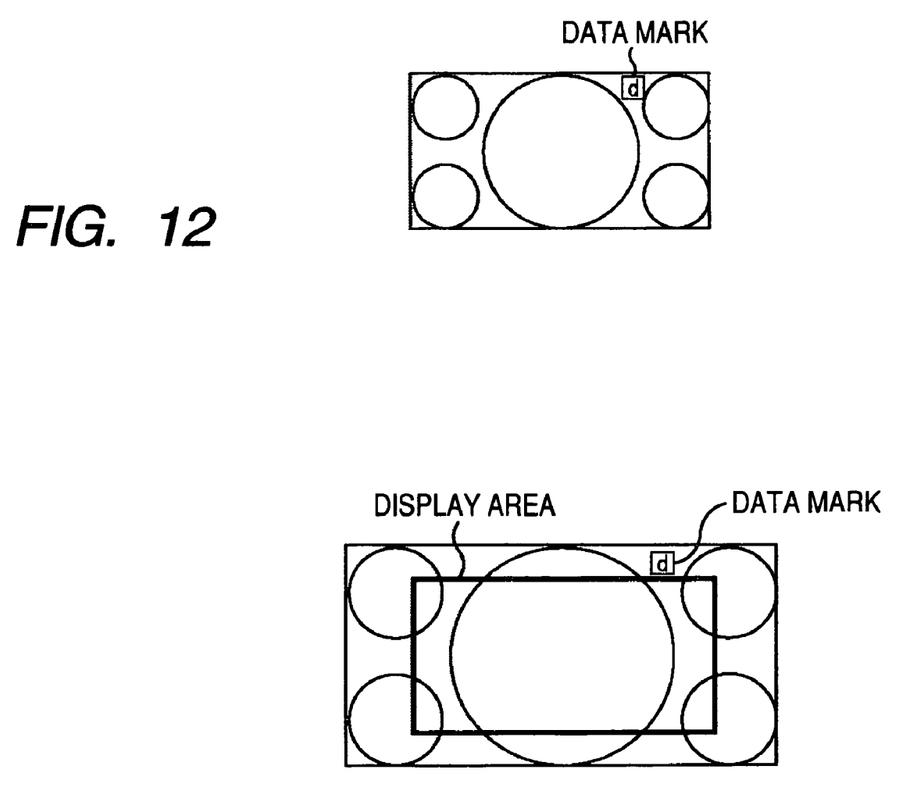
FIG. 12 presents diagrams showing data mark superposed images.

As the superposed image, for example, there may be formed the image (as will be suitably called the "data mark superposed image"), in which the data mark or the data of the data broadcast indicating the presence of the associated data is superposed on the ordinary 16:9 image as the TV broadcast program, as shown on the upper side of FIG. 12.

Here, the remote commander 31 is equipped with a <d> button to be operated when the associated data is displayed. When the user depresses the <d> button of the remote commander 31, the ordinary 16:9 image, as superposed on the data mark superposed image, is scaled, so that the scaling superposed image, in which the scaled ordinary 16:9 image and the associated data are superposed, is created and displayed.

The data mark superposed image is created not by scaling the ordinary 16:9 image but by superposing the data mark over the ordinary 16:9 image.

In case, therefore, the auto-wide processing is performed by using it as the trigger that the display object image does and does not become the superposed image, the auto-wide processing is performed by the trigger that the display object image changes from the image other than the superposed image to the data mark superposed image, or from the data mark superposed image to the image other than the superposed image.

In case the user sets the screen mode manually in the "zoom mode", as shown on the lower side of FIG. 12, to display the data mark superposed image, as shown on the upper side of FIG. 12, the display object image changes from the data mark superposed image to the ordinary 16:9 image, which has been superposed on the data mark superposed image but not scaled, i.e., to the image having no superposed data mark. Then, this change triggers the auto-wide processing.

In the auto-wide processing of this case, the "full mode" is selected as the screen mode on the basis of the image format of the ordinary 16:9 image or the nonscaled display object image. For the user, therefore, the screen mode is changed to the "full mode" without permission, so to speak, although the screen mode was manually changed to the "zoom mode", and the user may be caused to feel a physical disorder.

In case the auto-wide processing is performed when triggered by the change in the scaling state of the moving-image portion in the display object image, the moving-image portion is unchanged in the nonscaled state, even if the display object image is changed from the data mark superposed image to the ordinary 16:9 image, which has been superposed on the data mark superposed image but not scaled, so that the auto-wide processing is not performed. Therefore, it is possible to prevent such a screen mode from being changed as may cause the user to feel the physical disorder.

Here in this embodiment, the auto-wide processing is performed by the trigger of the change in the scaling state of the moving-image portion of the display object image. However, this trigger for the auto-wide processing may adopt not only the change in the scaling state of the moving-image portion in the display object image but also the switching of the voice mode of the digital broadcasting or the change in the image format of the display object image.

Moreover, a series of processing operations thus far described can be performed not only by the software such that the programs are executed by the CPU but also by a dedicated hardware.

Here, the embodiment of the invention should not be limited to the aforementioned one but could be modified in various manners without departing from the gist of the invention.

It should be understood by those skilled in the art that various modifications, combinations, sub-combinations and alterations may occur depending on design requirements and other factors insofar as they are within the scope of the appended claims or the equivalents thereof.

The invention claimed is:

1. A display control device for controlling the display of an image in a display device, the display control device comprising:
   decision means for deciding whether a scaling state of a moving-image portion in a display object image on the display device has changed as a function of comparing a previous scaling state and a current scaling state; and
   display control means for selecting a screen mode for displaying the display object image in response to a change in the scaling state of the moving-image portion in the display object image based on entire aspect information representative of an entire aspect ratio of the display object image, and displaying the display object image in the selected screen mode in the display device.

2. A display control method for controlling the display of an image in a display device, the display control method comprising steps for:
   deciding whether a scaling state of a moving-image portion in a display object image on the display device has changed by comparison of a previous scaling state and a current scaling state; and
   selecting a screen mode for displaying the display object image in response to a change in the scaling state of the moving-image portion in the display object image based on entire aspect information representative of an entire aspect ratio of the display object image and displaying the display object image in the selected screen mode in the display device.

3. A computer readable recording medium having a computer program stored thereon for causing a computer to execute a display control process for controlling the display of an image in a display device, the display control process comprising:
   deciding whether a scaling state of a moving-image portion in a display object image on the display device has changed as a function of comparing a previous scaling state and a current scaling state to determine one of an absence-to-presence scaling state change and a presence-to-absence scaling state change; and
   selecting a screen mode for displaying the display object image in response to a change in the scaling state of the moving-image portion in the display object image based on entire aspect information representative of an entire aspect ratio of the display object image, and displaying the display object image in the selected screen mode in the display device.

4. A display control device for controlling the display of an image in a display device, the display control device comprising:
   a decision unit configured to decide whether a scaling state of a moving-image portion in a display object image on the display device has changed by comparison of a previous scaling state and a current scaling state to determine one of an absence-to-presence scaling state change and a presence-to-absence scaling state change; and
   a display control unit configured to select a screen mode for displaying the display object image in response to a change in the scaling state of the moving-image portion in the display object image based on entire aspect information representative of an entire aspect ratio of the display object image, and to display the display object image in the selected screen mode in the display device.

* * * * *